United States Patent
Ma et al.

(10) Patent No.: US 9,038,018 B2
(45) Date of Patent: May 19, 2015

(54) INTEGRATING SOFTWARE COMPONENTS

(75) Inventors: Lily Ma, Bellevue, WA (US); Phillip M. Hoff, Duvall, WA (US); Lubomir I. Birov, Redmond, WA (US); Reza Chitsaz, Kirkland, WA (US); Steve C. Fox, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 764 days.

(21) Appl. No.: 12/900,477

(22) Filed: Oct. 8, 2010

(65) Prior Publication Data

US 2012/0089976 A1 Apr. 12, 2012

(51) Int. Cl.
*G06F 9/44* (2006.01)
*G06F 9/445* (2006.01)

(52) U.S. Cl.
CPC ....................................... *G06F 8/30* (2013.01)

(58) Field of Classification Search
None
See application file for complete search history.

(56) References Cited

U.S. PATENT DOCUMENTS

2004/0176968 A1* 9/2004 Syed et al. .......................... 705/1
2007/0260629 A1 11/2007 Tseitlin et al.
2010/0185954 A1 7/2010 Simernitski et al.

OTHER PUBLICATIONS

Cabral, et al., "Building Office Business Applications Using Visual Studio Tools for the Office System (3.0)", Retrieved at << http://msdn.microsoft.com/en-us/library/bb981164%28office.12%29.aspx >>, Jan. 2008, pp. 9.
Kanjilal, Joydip, "Creating and Deploying SharePoint Solution Files", Retrieved at << http://www.devx.com/dotnet/Article/40007 >>, Aug. 9, 2010, pp. 5.
Fox,Steve, "Integrate VSTO with SharePoint Content Types", Retrieved at << http://msdn.microsoft.com/en-us/magazine/cc507632.aspx >>, Aug. 10, 2010, pp. 7.
Gilani Altaf, "Creating Office Business Applications in Microsoft SharePoint 2010", Retrieved at << http://technet.microsoft.com/en-us/library/cc784175%28WS.10%29.aspx >>, Aug. 9, 2010, pp. 6.
"Packaging Software for Deployment", Retrieved at << http://technet.microsoft.com/en-us/library/cc784175%28WS.10%29.aspx >>, Mar. 28, 2003, pp. 8.
Dobson Rick, "Deploying Office 2000 Developer solutions" , Retrieved at << http://articles.techrepublic.com.com/5100-10878_11-5030267.html >>, Aug. 10, 2010, pp. 6.

\* cited by examiner

*Primary Examiner* — Qamrun Nahar
(74) *Attorney, Agent, or Firm* — Kevin Sullivan; Kate Drakos; Micky Minhas (57) ABSTRACT

Aspects of the subject matter described herein relate to integrating software components. In aspects, a previously created component is inserted into a target project. To do this, a location of elements of the component is obtained as well as a destination for placing the elements. Fixup code is also inserted into the project. The fixup code is to be executed after installing the component on a target entity prior to allowing the component to execute. The fixup code discovers the installation location of the component on the target entity and changes reference(s) from the original location to the installation location. After the component and the fixup code are inserted into the project, the project may be used to create a package which may be deployed on one or more target entities.

20 Claims, 5 Drawing Sheets

INTEGRATING SOFTWARE COMPONENTS

BACKGROUND

In developing software solutions it may be desirable to combine components created using different development tools. Doing so, however, may involve multiple manual steps in which a software developer performs manual actions to connect the different components together. The more manual steps a software developer needs to take, the less appealing it is to combine the components.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to integrating software components. In aspects, a previously created component is inserted into a target project. To do this, a location of elements of the component is obtained as well as a destination for placing the elements. Fixup code is also inserted into the project. The fixup code is to be executed after installing the component on a target entity and prior to allowing the component to execute. The fixup code discovers the installation location of the component on the target entity and changes element reference(s) from the original location to the installation location. After the component and the fixup code are inserted into the project, the project may be used to create a package which may be deployed on one or more target entities.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

Other definitions, explicit and implicit, may be included below.

Exemplary Operating Environment

Figure 1:
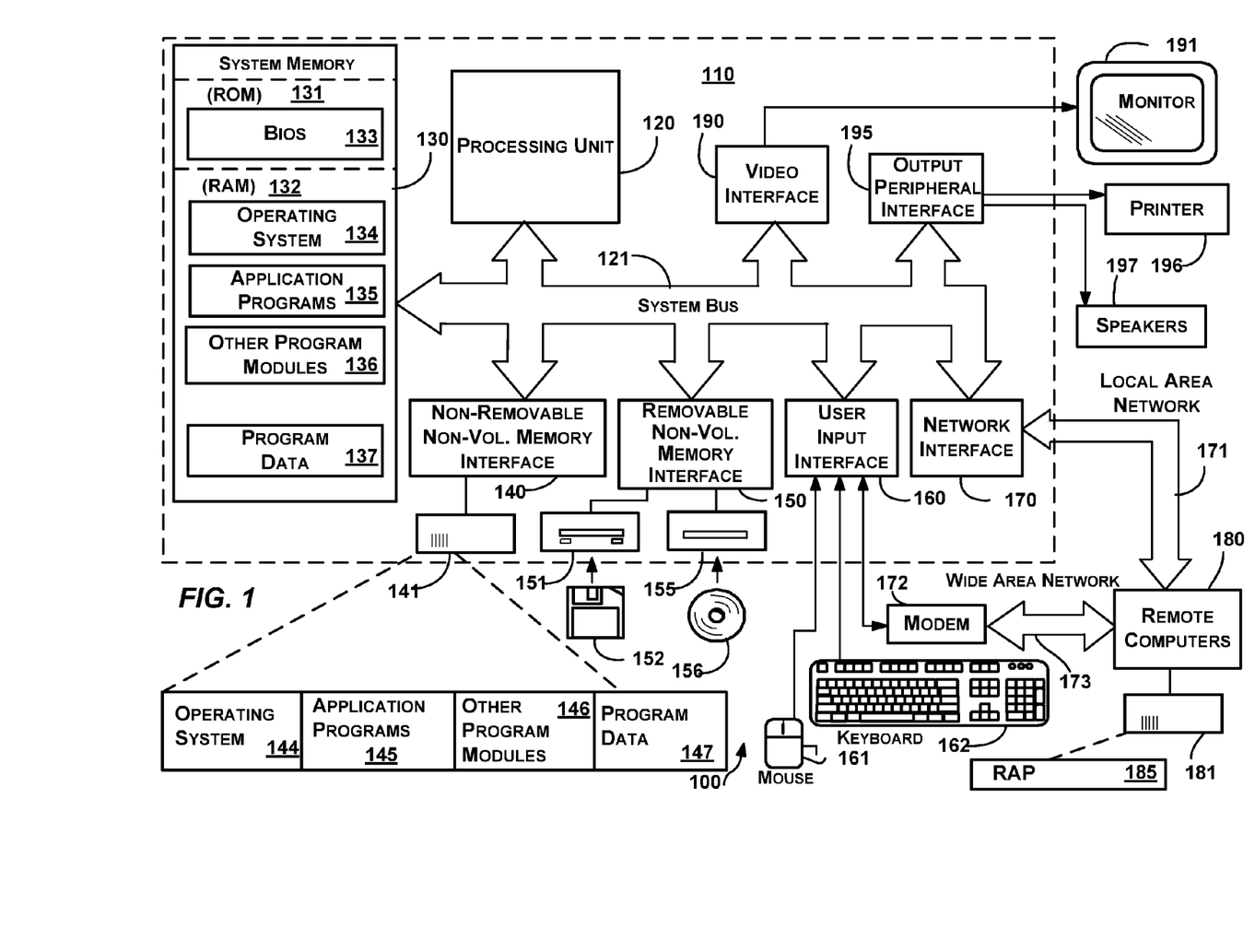
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Integrating Components

As mentioned previously, combining components created with multiple tools becomes less appealing as the number of manual steps involved increases.

Figure 2:
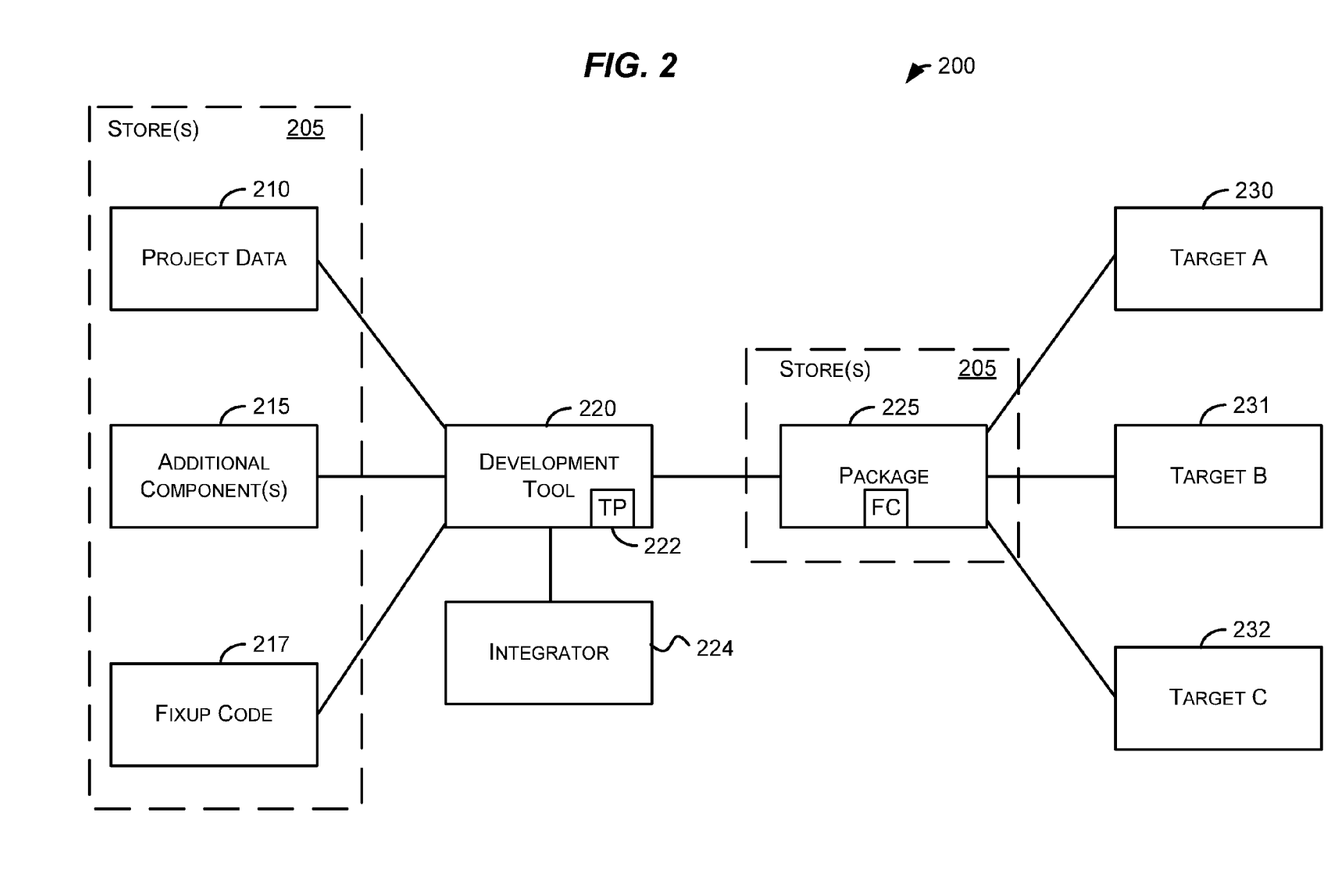
FIG. 2 is a block diagram that represents an exemplary system in which aspects of the subject matter described herein may operate

FIG. 2 is a block diagram that represents an exemplary system in which aspects of the subject matter described herein may operate. The entities illustrated in FIG. 2 are exemplary and are not meant to be all-inclusive of entities that may be needed or included in the system 200. In other embodiments, the entities and/or functions described in conjunction with FIG. 2 may be included in other entities (shown or not shown) or placed in sub entities without departing from the spirit or scope of aspects of the subject matter described herein. In some embodiments, the entities and/or functions described in conjunction with FIG. 2 may be distributed across multiple devices.

The system 200 may include one or more stores 205 (hereinafter referred to as stores 205), a development tool 220, an integrator 224, targets 230-232, and may include other entities (not shown). The various entities may be located relatively close to each other or may be distributed across the world.

The entities may be implemented using one or more computers (e.g., the computer 110 of FIG. 1). The various entities may be reachable via various networks including intra- and inter-office networks, one or more local area networks, wide area networks, direct connections, virtual connections, private networks, virtual private networks, some combination of the above, and the like.

The stores 205 may include any storage media capable of storing data. The data stored by the stores 205 may include project data 210, data representing the additional component(s) 215, fixup code 217, data representing the package 225, and the like.

The stores 205 may comprise hard disk storage, solid state, or other non-volatile storage, volatile memory such as RAM, other storage, some combination of the above, and the like and may be distributed across multiple devices (e.g., multiple SANs, multiple file servers, and the like). The store 205 may be external, internal, or include components that are both internal and external to one or more devices that implement the system 200.

The development tool 220 may include a software application used to develop and/or deploy software. In one exemplary embodiment, the development tool 220 may include an integrated development environment (IDE) that allows a software developer to enter and update code, debug code, create and update databases, associate the code with one or more databases, compile the code, create a package, do other actions, and the like.

The development tool 220 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

In operation, the development tool 220 may use the project data 210 to create the package 225. In particular, the development tool 220 may place code corresponding to the project data 210 or code derived therefrom into the package 225 for deploying to the targets 230-232.

The package 225 may include everything needed to install software on one or more targets. The package 225 may include code, configuration settings, and other data. One purpose of the package 225 is to combine the code, configuration settings, and other data in a deployment unit to simplify deployment. The package 225 may be a self-extracting file or files, a set of one or more files that are not self-extracting, an in-memory representation of the code, configuration settings, other data, and the like.

The project data 210 may include or reference data needed to create a software package (sometimes simply called a package). For example, this data may include or reference code, project settings, images, Web pages, HTML, XML, other content, and the like.

Code includes instructions that indicate actions a computer is to take. Code may also include data, resources, variables, definitions, relationships, associations, and the like that include information other than actions the computer is to take. For example, the code may also include images, Web pages, HTML, XML, other content, and the like.

The additional component(s) 215 may include one or more components that initially exist in a location outside of the project data 210. The additional component(s) 215 may include code that implements desired functionality (e.g., populating a word processing document, spreadsheet, or other document with data from a database).

The additional component(s) 215 may be created by a development tool other than the development tool 220. For example, referring to FIG. 3, a software developer may create an additional component with a development tool and publish (e.g., build) the component into a directory that is not referenced by the project data 210 of FIG. 2. The development tool 305 of FIG. 3 may be implemented in the same or a similar manner as the development tool 220 of FIG. 2 but may be geared for a different domain of applications. The additional component project data 300 is project data used by the development tool 305 to represent the additional component. Using the additional component project data 300, the development tool 305 may publish a component to a publish location 310 (e.g., a directory).

Figure 3:
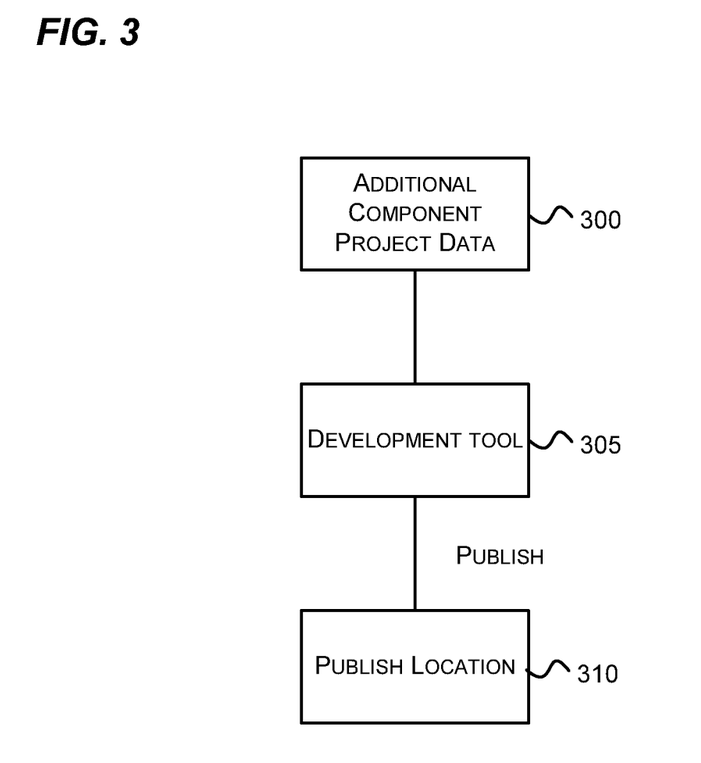
FIG. 3 is a block diagram that generally represents entities that may be involved in creating a component to inject into a project in accordance with aspects of the subject matter described herein.

Later, the software developer may seek to incorporate the component in a project represented by the project data 210 of FIG. 2. Unfortunately, the component may include information that associates the component with its published location. Returning to FIG. 2, each component of the additional component(s) 215 may be associated with a set of component elements. The component elements of a component may include, for example, deployment instructions, manifest data, code of the component, a document (e.g., a word processing, spreadsheet, other document, or the like) associated with the code, interoperability data, and the like.

One or more of the component elements may include or be associated with a location at which the component expects to find the component elements. For example, the location may be a directory to which the component was originally published. For example, the development tool (e.g., the development tool 305 of FIG. 3) that a software developer used to create a component may encode the publish directory into a component element so that the parts of the component needed to instantiate and execute the component may be obtained and utilized.

This location information that is encoded into the component elements may pose a problem when the component is installed on one of the targets 230-232. In particular, if a process of a target seeks to obtain component data using the location information, the process may attempt to find the component data in a directory to which the component was originally published (which may not exist on the target).

The integrator 224 may be used to remedy this and other issues of inserting the additional component(s) 215 into project data 210. In particular, the development tool 220 may allow a software developer to extend the development tool 220 by adding new component types (e.g., through the use of type providers). Herein, a component type is sometimes referred to simply as a type. After a new type is added, a software developer may use the new type in a project as if it were built into the original development tool.

To extend a component type of the development tool 220, the integrator 224 may inject the type provider 222 into the development tool 220. The type provider 222 may use extensibility points within the development tool 220 to allow other types (including the types of the additional component(s) 215) to be recognized and manipulated in projects.

The integrator 224 may receive input (e.g., a text box) that indicates a source location (e.g., a publish directory) of the additional component(s) 215 and a destination (e.g., a document library sometimes referred to simply as a library) for placing the component elements on a target entity. Some deployed solutions that include the component, for example, may not recognize the component unless the component elements are placed in a specified place (e.g., a library). In addition, security mechanisms may prevent using the component unless the component elements are included in the library.

The integrator 224 may configure the development tool 220 with the type provider. Configuring the development tool 220 with the type provider 222 is sometimes referred to as injecting the type provider into the development tool 220. In one embodiment, the type provider 222 and the integrator 224 may be combined.

After being injected into the development tool 220, the type provider 222 allows new component types (e.g., of the additional component(s) 215) to be used in the project data 210. After being injected into the development tool 220, the type provider 222 may copy the component elements from the source location to the project. Once the component elements are copied to the project, the component may be integrated with the project such that when the development tool 220 creates the package 225 for deployment, the component is also included in the package 225.

Even though the code of the component is package for deployment, however, it may not be recognized as mentioned previously unless it is placed in a specified location on the destination such as a library. To cause the component to be recognized, the type provider 222 may modify a mapping document. In particular, a mapping document may indicate where the component elements are to be installed on a target entity. To have the deployed solution (e.g., the package as installed on the target entity) recognize the additional component(s) 215, this document may be modified. In particular, the type provider 222 may modify this document to associate each component element with a destination (e.g., a library) on the target entity. In one implementation, the target provider 222 may do this by associating each component element with a module that has files that will be included in the library. In one sense, a module may be thought of as a logical bundle of files that will be placed in the library.

After the document has been modified, the deployed solution may recognize the additional component(s) but additional actions may be needed after installation to address the information that associates the additional component(s) with their originally published locations. To address this, the type provider 222 may also insert fixup code 217 into the project data 210.

The fixup code 217 is intended fix component reference(s) after the package 225 is installed on a destination. The fixup code 217 may execute after or in conjunction with installing the package 225 on a target entity and before executing code of the component on the target entity. The fixup code 217 is operable to change any reference(s) of the component (e.g., location information that is encoded in a component element) that reference the publish location to indicate a location of the elements on the target entity.

In particular, when executed, the fixup code 217 may query the target entity to determine where the component elements were installed on the target entity and may then modify reference(s) to the component elements so that the reference(s) associate the component elements with their installed location. An installed location may include a directory, library, module, database, or the like.

The fixup code 217 may be inserted into the project data 210 so that when the package 225 is created, the fixup code 217 is also encoded in the package 225. The fixup code 217 may also be encoded in the package 225 such that the fixup code 217 will execute upon a target device during installation, upon activation of a feature that includes the component, or at some other time before code for the component executes on the target entity.

To set the timing of the execution of the fixup code 217, in one implementation, the type provider 222 may insert data into the project data 210 that causes an event receiver to be registered upon installation of the package on a target entity. The event receiver may be operable, for example, to receive an event that indicates that a feature associated with the additional component is being activated. The event receiver may then execute the fixup code 217 upon receiving the event.

A software developer may update the additional component(s) 215 (e.g., via the development tool 305) and seek to have the updated component(s) in the package 225 of FIG. 2. To address this issue, the type provider 222 may be operable to configure the development tool 220 to display a user interface element to receive a sync command. The user interface element may include a button, menu item, context item, other user interface element, or the like to allow a software developer to indicate that a sync is needed.

After a sync command is received through the user interface element, the type provider 222 may delete any component elements that exist in the project data 210, scan the publish location to obtain up-to-date component elements, add the up-to-date component elements to the project data 210, and re-insert the fixup code 217 (if it has been deleted or needs to be changed).

In some embodiments, other mechanisms may be used to determine that an additional component needs to be re-imported into the project data 210. For example, in some implementations, the type provider 222 may watch for or be informed of changes to the publish directory of the additional component(s) 215 and may treat a change to indicate that a sync is needed.

Figure 4:
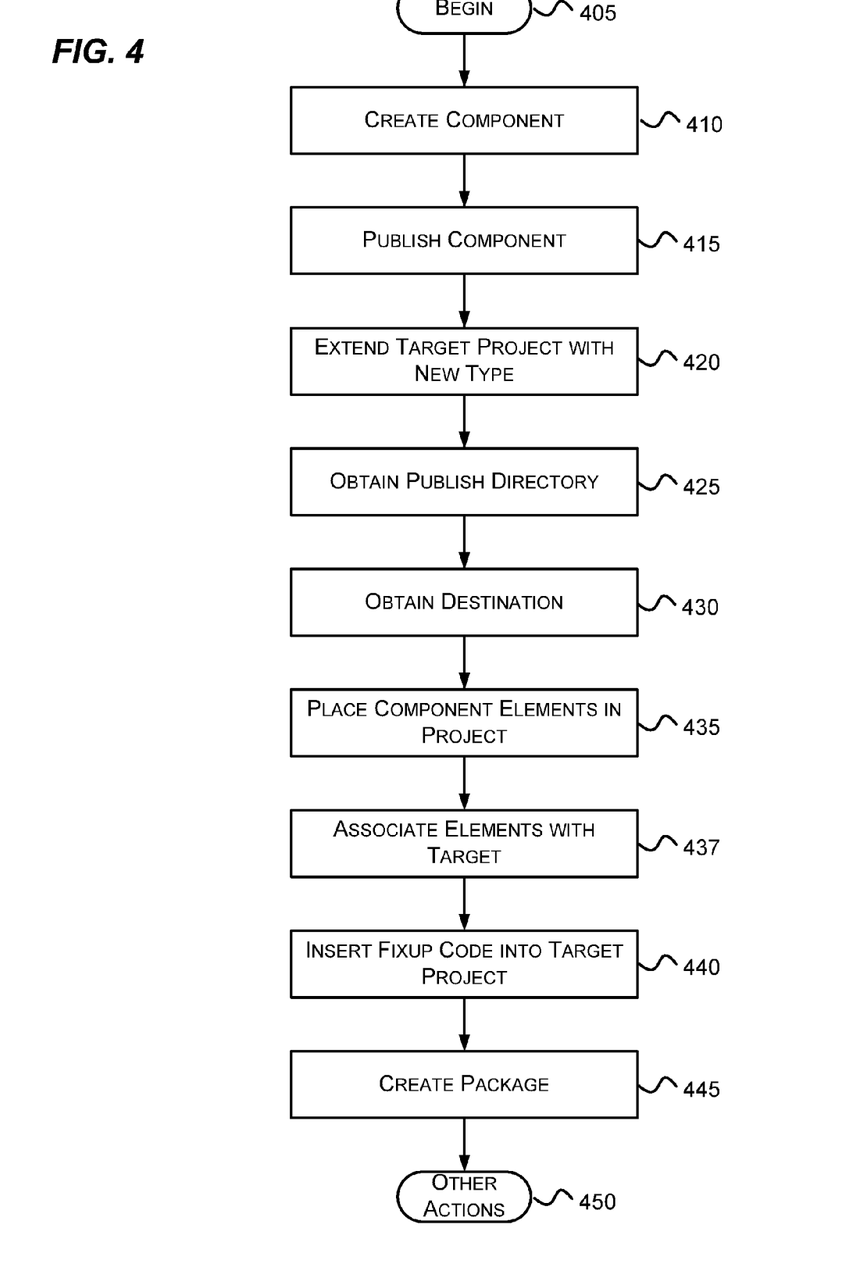
FIG. 4 is a flow diagram that generally represents exemplary actions that may occur prior to creating a package in accordance with aspects of the subject matter described herein.
Figure 5:
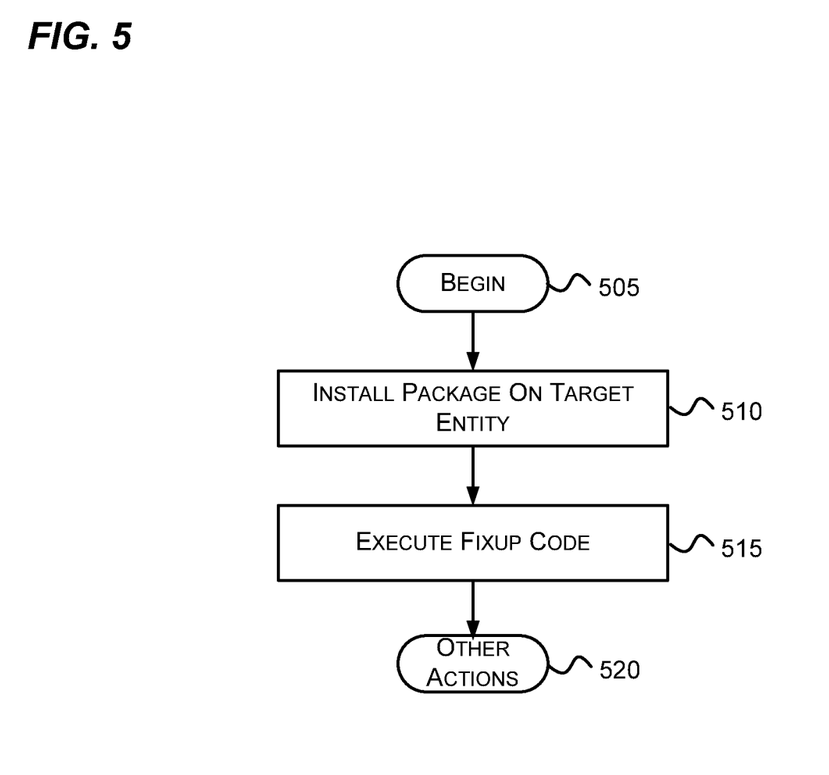
FIG. 5 is a flow diagram that generally represents exemplary actions that may occur prior to using a component on a target entity in accordance with aspects of the subject matter described herein

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur prior to creating a package in accordance with aspects of the subject matter described herein. Turning to FIG. 4, at block 405, the actions begin. At block 410, a component is created. For example, referring to FIG. 3, the development tool 305 is used to create a component.

At block 415, the component is published. For example, referring to FIG. 3, the development tool 305 is used to publish the component to the publish location 310.

At block 420, the target project is extended with a new type. For example, referring to FIG. 2, the integrator 224 may extend the development tool 220 by injecting the type provider 222 into the development tool 220. The type provider 222 may perform actions for the types of the additional component(s) 215 as mentioned previously.

At block 425, an indication of the publish location (e.g., a directory) of the component is received. For example, referring to FIG. 2, a software developer may enter a source location (e.g., the publish location) in a user interface element such as a dialog box, form, or the like, for example.

At block 430, an indication of the destination for placing the elements in the target entity is received. For example, referring to FIG. 2, a software developer may indicate a destination library via a user interface element provided by the integrator 224.

At block 435, the component elements are placed in the target project. For example, referring to FIG. 2, the type provider 222 may copy the component elements into the project data.

At block 437, the component elements are associated with the destination. For example, referring to FIG. 2, the type provider 222 may update a document to associate the elements with a library (e.g., via associating the elements with a module) indicated by the destination.

At block 440, the fixup code is inserted into the target project. For example, referring to FIG. 2, the fixup code 217 may be inserted into the project data 210. The fixup code 217 may be identified to the development tool 220, for example, by the type provider 222 in conjunction with extending the target project with the new type.

At block 445, a package based on the target project is created. For example, referring to FIG. 2, the development tool 220 creates the package 225 based on the project data 210 (which now includes the additional component(s) 215, the document that maps the component elements to a destination, and the fixup code 217).

As mentioned previously, the fixup code that is inserted into the target project may be placed (e.g., structured in the project) to cause the fixup code to execute in conjunction with or after installation of the package 225 (e.g., upon activation of a feature that includes the component). This may be accomplished, for example, by inserting data into the target project that causes an event receiver to be registered upon installation of the package on the target entity. As mentioned previously, the event receiver may be operable to receive an event that indicates that the feature is being activated and to execute the fixup code upon receiving the event.

At block 450, other actions may occur. Other actions may include, for example, receiving a sync command from a user interface (or otherwise determining—e.g., via watching the publish location—that the component has changed) and in response performing actions, including:

1. Deleting any of the elements that exist in the target project;
2. Scanning the source location to obtain up-to-date elements;
3. Adding the up-to-date elements into the target project at the destination; and
4. Inserting the fixup code into the target project as needed.

FIG. 5 is a flow diagram that generally represents exemplary actions that may occur prior to using a component on a target entity in accordance with aspects of the subject matter described herein. At block 505, the actions begin.

At block 510, the package is installed on the target entity. For example, referring to FIG. 2, the package 225 may be installed on the target 231. As mentioned previously, the package includes a component (e.g. the additional component) that has a reference to a published location of elements of the component. The published location indicates a location at which the elements of the component were placed prior to putting the elements in a project from which the package is derived.

At block 515, the fixup code is executed to change the reference(s) to the location that the elements are installed on the target entity. For example, referring to FIG. 2, the fixup code 217 is executed on the target to change a reference of the elements of the additional component(s) 215 to a location in which these additional component(s) 215 are installed on the target 231.

At block 520, other actions if any, may be performed.

As can be seen from the foregoing detailed description, aspects have been described related to integrating software components. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
receiving an indication by an integrated development environment (IDE) of a source location of elements of a component that is external to a target project, the IDE used to develop and/or deploy software;
receiving an indication by the IDE of a destination for placing the elements on a target entity;
placing the elements in the target project;
associating the elements with the destination;
inserting fixup code by the IDE into the target project, the fixup code to be executed after or in conjunction with installing a self-extracting package on a target entity and before executing code of the component on the target entity, the fixup code operable to change a reference to the source location of elements of the component to indicate a location of the elements on the target entity; and creating the self-extracting package based on the target project.

2. The method of claim 1, further comprising extending the target project with a type associated with the component to allow the component to be integrated into the target project.

3. The method of claim 1, further comprising determining that the component has changed and in response, performing additional actions, comprising:
  deleting any of the elements that exist in the target project;
  scanning the source location to obtain up-to-date elements;
  adding the up-to-date elements into the target project; and
  inserting the fixup code into the target project.

4. The method of claim 1, where associating the elements with the destination comprises indicating that the elements are to be included in a library of the target entity.

5. The method of claim 4, wherein indicating that the elements are to be included in a library of the target entity comprises indicating that the elements are to be included in a module.

6. The method of claim 5, wherein indicating that the elements are to be included in a module comprises updating a document to associate the module with each of the elements.

7. The method of claim 1, further comprising structuring the target project to cause the fixup code to execute upon activation of a feature that includes the component.

8. The method of claim 7, wherein structuring the target project to cause the fixup code to execute upon activation of a feature that includes the component comprises inserting data into the target project that causes an event receiver to be registered upon installation of the self-extracting package on the target entity, the event receiver operable to receive an event that indicates that the feature is being activated, the event receiver further operable to execute the fixup code upon receiving the event.

9. In a computing environment, a system, comprising:
  a computer comprising a processing unit coupled to a memory, the computer further comprising:
  one or more stores that include project data, component elements, and fixup code, the component elements associated with a component, the component elements initially existing in a location outside of the project data, the component elements including a reference to the location, the fixup code structured to be executed after or in conjunction with installing a package on a target entity and before executing code associated with the component on the target entity, the fixup code operable to change the reference to the location to indicate a location of the elements on the target entity;
  a development tool used to develop and/or deploy software, the development tool operable to create the package based on the project data and to insert the fixup code in the package;
  an integrator operable to receive input regarding the location of the component elements and a destination for placing the component elements, the component integrator further operable to inject a type provider for the component into the development tool.

10. The system of claim 9, wherein the development tool is further operable to interact with the type provider to extend the project data with a type associated with the component.

11. The system of claim 9, wherein the type provider is further operable to configure the development tool to display a user interface element operable to receive a sync command, in response to receiving the sync command, the type provider is further operable to perform actions, comprising:
  deleting any of the component elements that exist in the project data;
  scanning the location to obtain up-to-date component elements;
  adding the update-to-date component elements to the project data; and
  if the fixup code does not exist in the project data, inserting the fixup code into the project data.

12. The system of claim 9, wherein the type provider is further operable to indicate that the component elements are to be included in a library of the target entity, the library corresponding to the destination.

13. The system of claim 12, wherein the type provider being operable to indicate that the component elements are to be included in a library of the target entity comprises the type provider being operable to indicate that the elements are to be included in a module.

14. The system of claim 13, wherein the type provider being operable to indicate that the elements are to be included in a module comprises the type provider being operable to update a document to associate the elements with the module, the document structured for installing the package on the target entity, the document indicating associations between the elements and the module.

15. The system of claim 9, wherein the type provider is further operable to insert, into the project data, event code that causes the fixup code to be executed on the target entity upon activation of a feature that includes the component.

16. The system of claim 9, wherein the type provider being operable to insert the event code comprises the type provider configuring the development tool to insert, into the package, code that causes an event receiver to be registered upon installation of the package on the target entity, the event receiver operable to receive an event that indicates that the feature is being activated, the event receiver further operable to execute the fixup code upon receiving the event.

17. The system of claim 9, further comprising another development tool operable to generate the component elements and to store the component elements in the location.

18. A computer storage medium having computer-executable instructions, which when executed perform actions, comprising:
  receiving an indication by an integrated development environment (IDE) of a source location of elements of a component that is external to a target project, the IDE used to develop and/or deploy software;
  receiving an indication by the IDE of a destination for placing the elements on a target entity;
  placing the elements in the target project;
  associating the elements with the destination;
  inserting fixup code by the IDE into the target project, the fixup code to be executed after or in conjunction with installing a self-extracting package on a target entity and before executing code of the component on the target entity, the fixup code operable to change a reference to the source location of elements of the component to indicate a location of the elements on the target entity; and
  creating the self-extracting package based on the target project.

19. The computer storage medium of claim 18, further comprising extending the target project with a type associated with the component to allow the component to be integrated into the target project.

20. The computer storage medium of claim 18, further comprising determining that the component has changed and in response, performing additional actions, comprising:
 deleting any of the elements that exist in the target project;
 scanning the source location to obtain up-to-date elements;
 adding the up-to-date elements into the target project; and
 inserting the fixup code into the target project.

\* \* \* \* \*